(12) United States Patent
Sjöö

(10) Patent No.: US 8,550,753 B2
(45) Date of Patent: Oct. 8, 2013

(54) FACE MILL FOR FINE MILLING

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 352 days.

(21) Appl. No.: 12/944,085

(22) Filed: Nov. 11, 2010

(65) Prior Publication Data

US 2011/0150582 A1    Jun. 23, 2011

(30) Foreign Application Priority Data

Dec. 18, 2009    (SE) ...................................... 0950983

(51) Int. Cl.
*B23C 5/20*    (2006.01)
(52) U.S. Cl.
USPC .................................. 407/34; 407/42; 407/61
(58) Field of Classification Search
CPC ..................................... B23C 5/20; B23C 5/22
USPC .............. 407/34, 40, 42, 47, 48, 61
See application file for complete search history.

(56) References Cited

U.S. PATENT DOCUMENTS

| | | | | |
|---|---|---|---|---|
| 3,576,061 | A * | 4/1971 | Pahlitzsch | 407/60 |
| 3,792,514 | A * | 2/1974 | Ushijima | 407/113 |
| 4,194,860 | A * | 3/1980 | Hopkins | 407/42 |
| 4,743,144 | A | 5/1988 | Shikata | |
| 4,789,273 | A * | 12/1988 | Wiacek et al. | 407/34 |
| 5,395,186 | A * | 3/1995 | Qvart | 407/46 |
| 5,443,334 | A * | 8/1995 | Pantzar | 407/113 |
| 6,270,292 | B1 * | 8/2001 | Satran et al. | 407/42 |
| 8,282,320 | B2 * | 10/2012 | Hartlohner et al. | 407/113 |
| 2004/0265073 | A1 * | 12/2004 | Hoefler et al. | 407/34 |
| 2005/0023044 | A1 | 2/2005 | Schuffenhauer et al. | |
| 2008/0003067 | A1 * | 1/2008 | Ejderklint et al. | 407/40 |

FOREIGN PATENT DOCUMENTS

JP    52-35160    3/1977
WO    WO 2008/138414 A1 *    11/2008

OTHER PUBLICATIONS

European Search Report for European Application No. 10189942.5, dated Jul. 16, 2013.

* cited by examiner

*Primary Examiner* — Daniel Howell
*Assistant Examiner* — Ryan Rufo
(74) *Attorney, Agent, or Firm* — Morgan, Lewis & Bockius LLP

(57) ABSTRACT

A face mill and a replaceable milling insert are disclosed. The front side of the milling insert is tilted at a clearance angle ($\epsilon$) in relation to the reference plane (RP). The cutting edge of the milling insert extends between two end points, which move in circular paths of different radii. The cutting edge forms a negative radial angle ($\delta$) with an imaginary radial line (A) that extends from the center axis (C1) of the basic body and intersects the first end point of the cutting edge. The front side and chip surface of the milling insert mutually form a nominal angle ($\beta$) that amounts to at most 83°. The cutting edge is straight and in the entire length thereof situated in the reference plane (RP), the negative radial angle ($\delta$) thereof amounting to at least 70°.

17 Claims, 8 Drawing Sheets

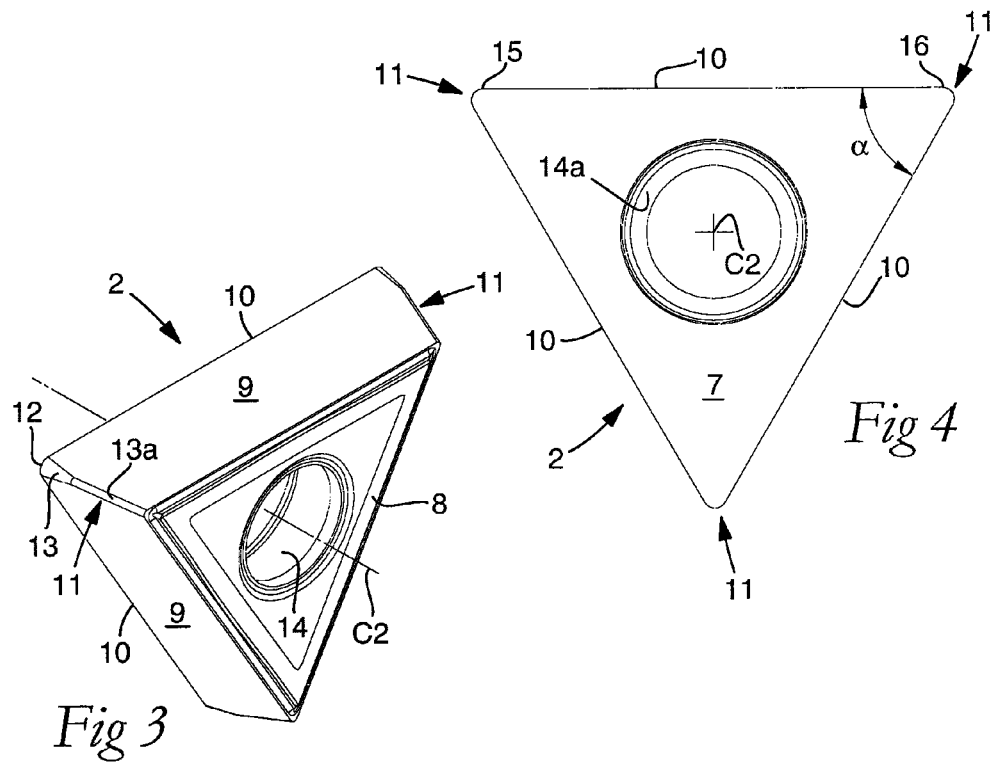
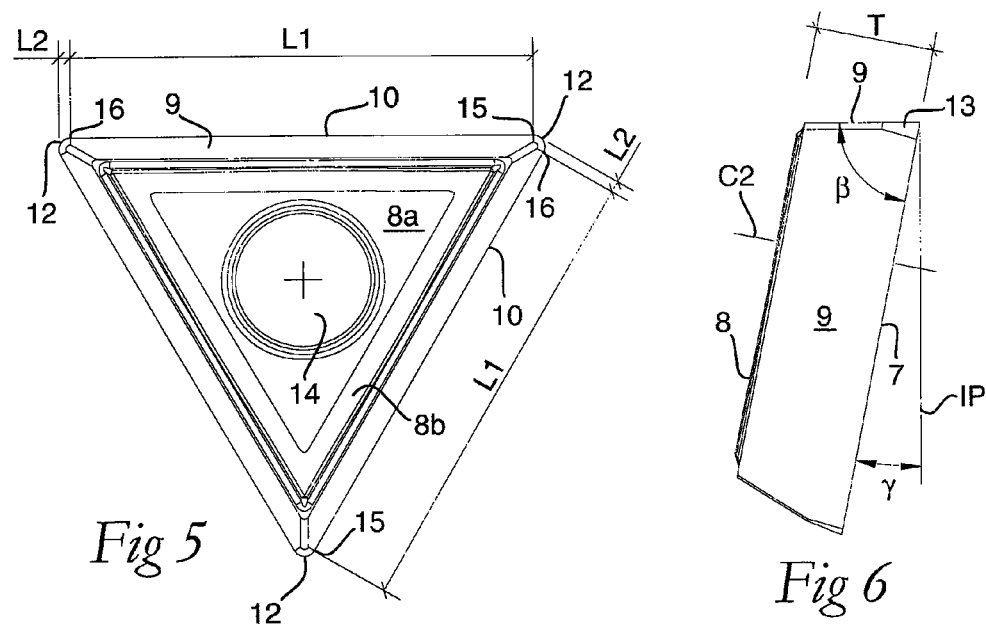

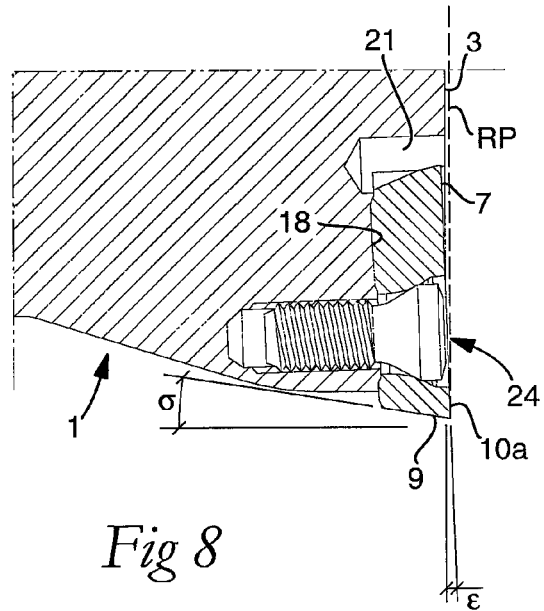
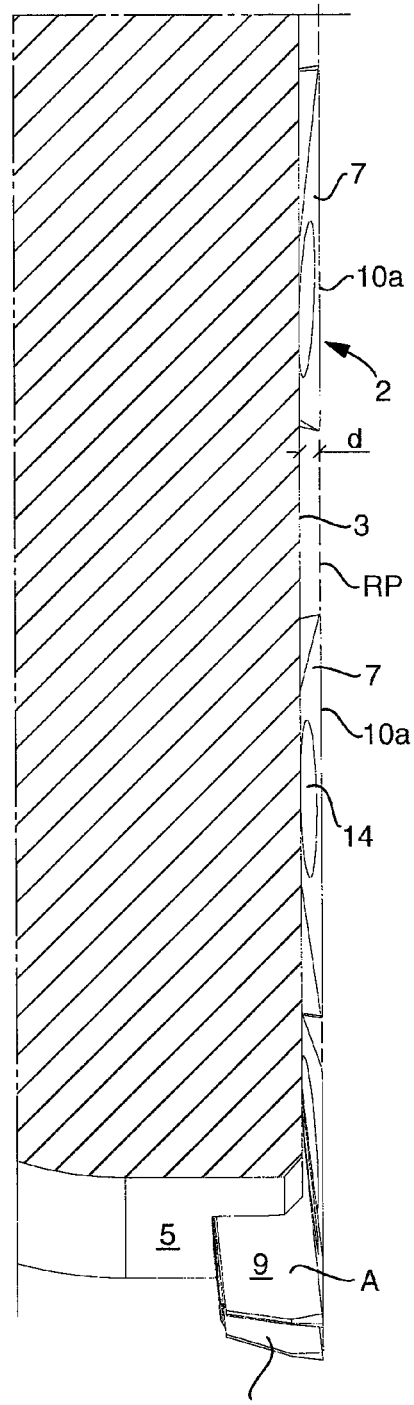
Fig 8
Fig 9

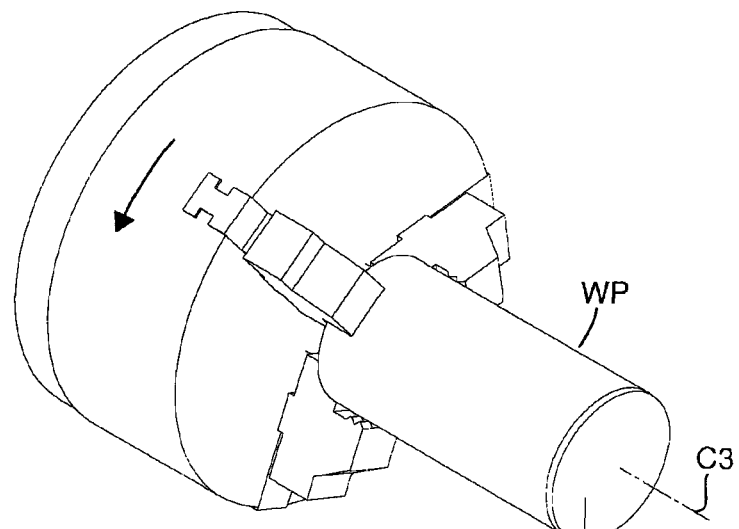
*Fig 13*
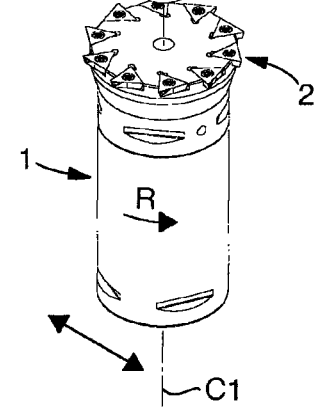
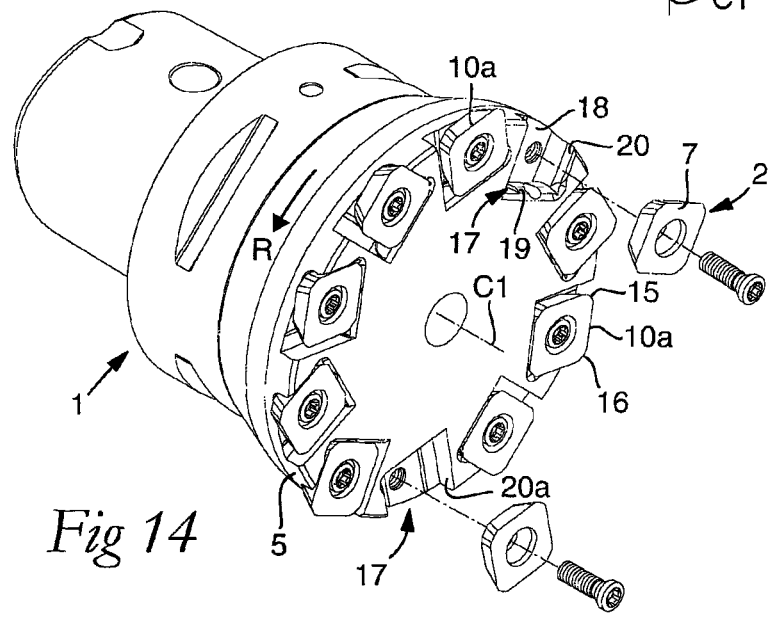
*Fig 14*

FACE MILL FOR FINE MILLING

This application claims priority under 35 U.S.C. §119 to Swedish Patent Application No. 0950983-7, filed on Dec. 18, 2009, which is incorporated by reference herein in its entirety.

FIELD OF THE INVENTION

The present invention relates generally to a face mill for fine milling of the kind that includes, on one hand, a basic body that is rotatable around a center axis in a predetermined direction and has a front end surface as well as an envelope surface concentric with the center axis, and on the other hand a replaceable milling insert that is mounted in a seat. The insert has the shape of a polygon that includes a front side, a back side and a plurality of side surfaces, which converge in pairs into corners and at least one of which forms a chip surface that, together with the front side, delimits a cutting edge, which is tangent to an imaginary reference plane that extends perpendicular to the center axis and is axially spaced apart in the forward direction from the front end surface of the basic body. The front side of the milling insert is tilted at a clearance angle in relation to the reference plane, the cutting edge of the milling insert extending between two end points, a first one of which, during the rotation of the mill, is heading the second one as well as moves in a circular path, the radius of which is smaller than the radius of a circular path in which the second, rotationally trailing end point moves. The cutting edge forms a negative radial angle with an imaginary radial line that extends from the center axis of the basic body and intersects the first end point of the cutting edge.

The aim of providing a face mill intended for fine milling or surface wiping and particularly suitable for the machining of short-chipping metals, such as grey cast iron, hard steel and aluminium, forms a basis of the invention. The desired properties of the face mill are that the same quickly and efficiently should be able to strip a thin surface layer (max. 0.5 mm) from an unmachined or roughly machined workpiece, and leave a surface the smoothness or surface finish of which is sufficient to make finishing in the form of grinding or the like unnecessary in many applications.

BACKGROUND OF THE INVENTION

A face mill is previously known by U.S. Pat. No. 4,743,144. However, in this face mill, the cutting edges and the chip surfaces connecting to the same are archedly curved or circular. This means that the active cutting edge—depending on the rise of the curvature or arc line—will cut more or less deeply into the surface being machined, and thereby give rise to marked, concave chutes in the completed surface (see FIG. 11 of U.S. Pat. No. 4,743,144). In other words, the surface finish becomes far from optimum, in particular when the milling inserts are circular and the arc line of the individual cutting edge has a great rise. Another disadvantage of the known face mill is that the milling inserts thereof have a negative cutting geometry, i.e., the front and back sides have identical shape and size, whereby any given generatrix along the arched chip surface extends perpendicular to the front side as well as to the back side. This means that the material to be released will be pushed (rotationally) in front of the chip surface and rather be pressed into the surface of the workpiece than being cut away or stripped from the same. Another disadvantage of the face mill disclosed in U.S. Pat. No. 4,743,144—which is shown equipped with a plurality of milling inserts—is that the individual milling insert is detachably mounted in a seat in a cassette, which in turn is semi-permanently fixed in a peripheral pocket in the basic body, more precisely by a screw joint. In contrast to such mills in which the seats of the milling inserts are recessed directly in the proper basic body, cassettes of that kind give rise to a plurality of problems, among other things a complicated and expensive manufacture of the face mill in its entirety as well as an awkward adjustment of the milling inserts with the purpose of locating all active cutting edges in exactly one and the same plane. In this connection, the mere existence of a plurality of cassettes, which cannot for sure be mounted completely immovable in the basic body, constitutes risky sources of error.

A face mill having principally the same design as the face mill according to U.S. Pat. No. 4,743,144 is furthermore known by JP 52-35160. In this case, the active cutting edges of the milling inserts are per se straight and situated in a common plane. Serious disadvantages of this face mill are, however, on one hand, that the negative radial angle of the cutting edges is very limited (smaller than 45°), and on the other hand that the effective rake angle of the milling inserts, i.e., the angle between the chip surface of the individual milling insert and the plane surface to be generated is negative, i.e., smaller than 90°. The limited negative radial angle means that the milling insert will be subjected to very great stresses, not only when the same enters the workpiece but also after that. This in combination with the negative rake angle makes the milling insert blunt-cutting, the sheared off metal material tending to be pressed inward/downward against the unmachined surface rather than to be brought in the direction away from the same. In addition, the force required for the feed of the mill becomes comparatively great.

The present invention aims at obviating the above-mentioned disadvantages of the face mill previously known. An object of the invention to provide a face mill that has the capacity of removing a thin surface shell from workpieces having slightly or moderately uneven surfaces while producing a finish-machined surface having an extraordinary high surface finish. In the applications intended for the face mill, the cutting depth is incidental and may in practice be maximized to approx. 0.5 mm, wherein a surface finish of down to 1 μm should be attainable.

Another object of the invention is to provide a face mill that can operate with short machining operations per machined surface unit; all with the ultimate purpose of reducing the cost of the machining operation in question to a minimum. Furthermore, the replaceable milling inserts of the tool should not only be easy-cutting with the purpose of allowing fast cutting processes, but also strong to ensure an optimum service life and good machining economics.

Yet another object of the invention is to provide a face mill that can be equipped with a large number of milling inserts without imminent risk of the same being erroneously mounted in relation to the plane or the line along which the even surface is to be generated. Also the manufacture of the face mill as well as the handling of the same should be effectable in an efficient and economic way.

SUMMARY OF THE INVENTION

In an embodiment, the invention provides a face mill for fine milling, including a basic body that is rotatable around a center axis (C1) in a predetermined direction and has a front end surface as well as an envelope surface concentric with the center axis (C1). A replaceable milling insert is mounted in a seat and has the shape of a polygon that includes a front side, a back side and a plurality of side surfaces, which converge in pairs into corners and at least one of which forms a chip surface that, together with the front side, delimits a cutting edge, which is tangent to an imaginary reference plane (RP) that extends perpendicular to the center axis (C1) and is axially spaced apart in the forward direction from the front end surface of the basic body. The front side of the milling insert is tilted at a clearance angle ($\epsilon$) in relation to the reference plane (RP). The cutting edge of the milling insert extends between two end points, a first one of which, during the rotation of the mill, is heading the second one as well as moves in a circular path, the radius of which is smaller than the radius of a circular path in which the second, rotationally trailing end point moves. The cutting edge forms a negative radial angle ($\delta$) with an imaginary radial line (A) that extends from the center axis (C1) of the basic body and intersects the first end point of the cutting edge. The front side and chip surface of the milling insert mutually form a nominal angle ($\beta$) that amounts to at most 83°. The cutting edge is straight and in the entire length thereof situated in the reference plane (RP), the negative radial angle ($\delta$) thereof amounting to at least 70°.

Before the invention is further described, it is important to keep apart characteristics of the inventive milling insert when the same is regarded, on one hand, alone by the side of the basic body, and on the other hand mounted in the basic body. In the first state, the milling insert is regarded and defined generally in either plane elevation or side elevation, wherein occurring clearances, clearance angles and rake angles are nominal and related to the milling insert's own center axis, the chip surfaces thereof as well as the front and under sides thereof. In the state mounted in the basic body, the rake and clearance angles of the milling insert are however functional or effective and depending on the geometry of the basic body. In other words, the angles are different depending on if they are nominal, i.e., specific to only the milling insert as such, or effective, viz. in the tipped-in position in the tool.

As used here, one and the same surface of the milling inserts of the face mill having the form of a polygon will be denominated either "side surface" or "chip surface". Thus, the denomination "side surface" is used when the geometrical shape of the polygon is referred to, while "chip surface" relates to the function of the surface in connection with a co-operating cutting edge removing chips from the workpiece.

In order to further facilitate the understanding of the nature of the invention, a fundamental difference should already now be made clear between on one hand conventional face milling inserts and on the other hand fine milling inserts of the kind that is disclosed in U.S. Pat. No. 4,743,144 as well as is a subject of the present invention. A conventional face milling insert of uniform thickness of the indexable type has generally a flat shape that is featured by at least one of a pair of upper and under sides (or front and back sides) serving as a chip surface, while the usually thin side surfaces, which, together with the chip surface, delimit a number of cutting edges, serving as clearance surfaces. Each active cutting edge includes a chip-removing main edge, a surface-wiping secondary edge or wiper edge, the first-mentioned one of which rotates in a circular path and effects the proper chip removal while generating a surface of revolution, while the last-mentioned one, together with the secondary edges of the other milling inserts, moves in a plane that extends perpendicular to the center axis of the milling or basic body so as to generate a plane surface. While each one of the main edges forming a certain setting angle in relation to the plane cuts out the chips from the workpiece, the secondary edges operating in a common plane effect a wiping or smoothing of the generated, plane surface without generating any chips of appreciable size. In this connection, the milling inserts are tipped-in in the basic body in such a way that the comparatively thin side surfaces or clearance surfaces present rotationally behind the chip-removing main edges clear from the rotationally symmetrical surface generated by the same, at the same time as the surfaces situated rotationally behind the surface-wiping secondary edges clear from the generated, plane surface. In order to allow substantial cutting depths, the chip-removing main edges are generally longer than the surface-wiping secondary edges.

Also the milling insert used in the face mill according to U.S. Pat. No. 4,743,144 has generally a flat basic shape in so far that the front and back sides thereof are plane and mutually parallel. In this case, however, neither the front side nor the back side serves as a chip surface but, on the contrary, the comparatively thin side surface or surfaces that extend(s) between the front and back sides. In this connection, the individual cutting edge is delimited between the chip surface (featured by it being arched or round) and the plane front side facing away from the front end surface of the basic body. Therefore, the proper chip removal is carried out in the plane common to the cutting edges, rather than along some peripheral surface of revolution.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 3 is an enlarged perspective view showing a milling insert included in the face mill, more precisely obliquely from behind;

FIG. 4 is a planar view showing the same milling insert from the front;

FIG. 5 is a planar view showing the milling insert from behind;

FIG. 6 is a side view of the milling insert, more precisely in a tipped state in relation to a reference plane;

FIG. 8 is an enlarged detailed section VIII-VIII in FIG. 7;

FIG. 9 is an enlarged detailed section IX-IX in FIG. 7;

FIG. 13 is a perspective view that illustrates how the face mill according to an embodiment of the invention also can be used for the machining of a cylindrical or otherwise rotationally symmetrical envelope surface;

FIG. 14 is a perspective exploded view showing an alternative embodiment of a face mill that makes use of quadratic milling inserts;

DETAILED DESCRIPTION OF THE PREFERRED EMBODIMENTS

Figure 1:
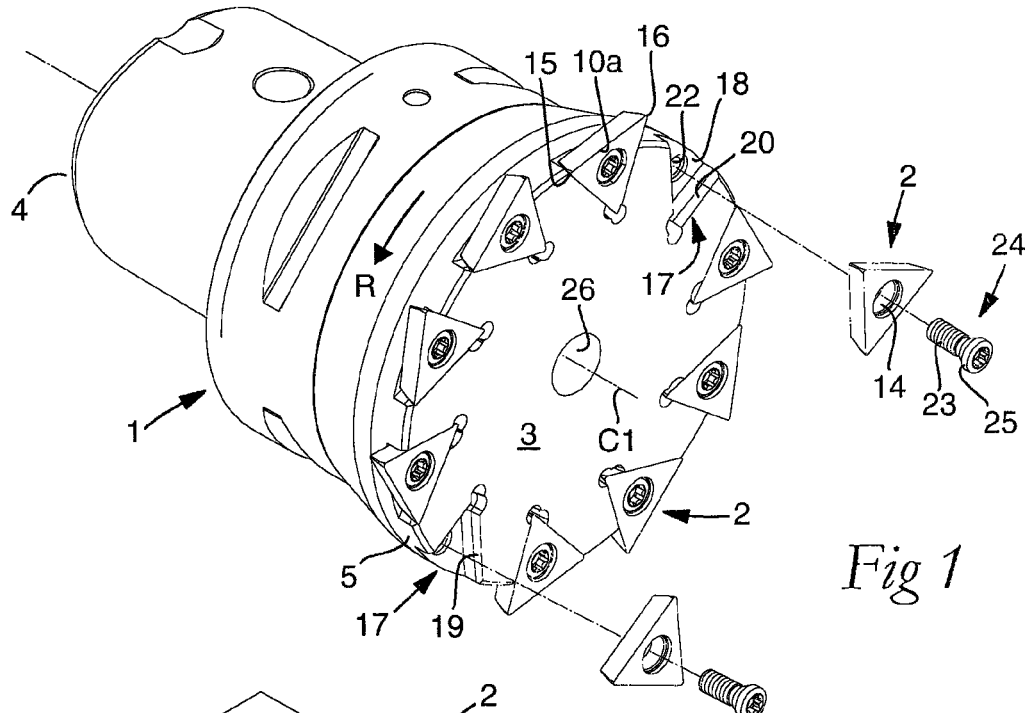
FIG. 1 is a perspective exploded view that illustrates a face mill according to an embodiment of the invention equipped with triangular milling inserts.
Figure 2:
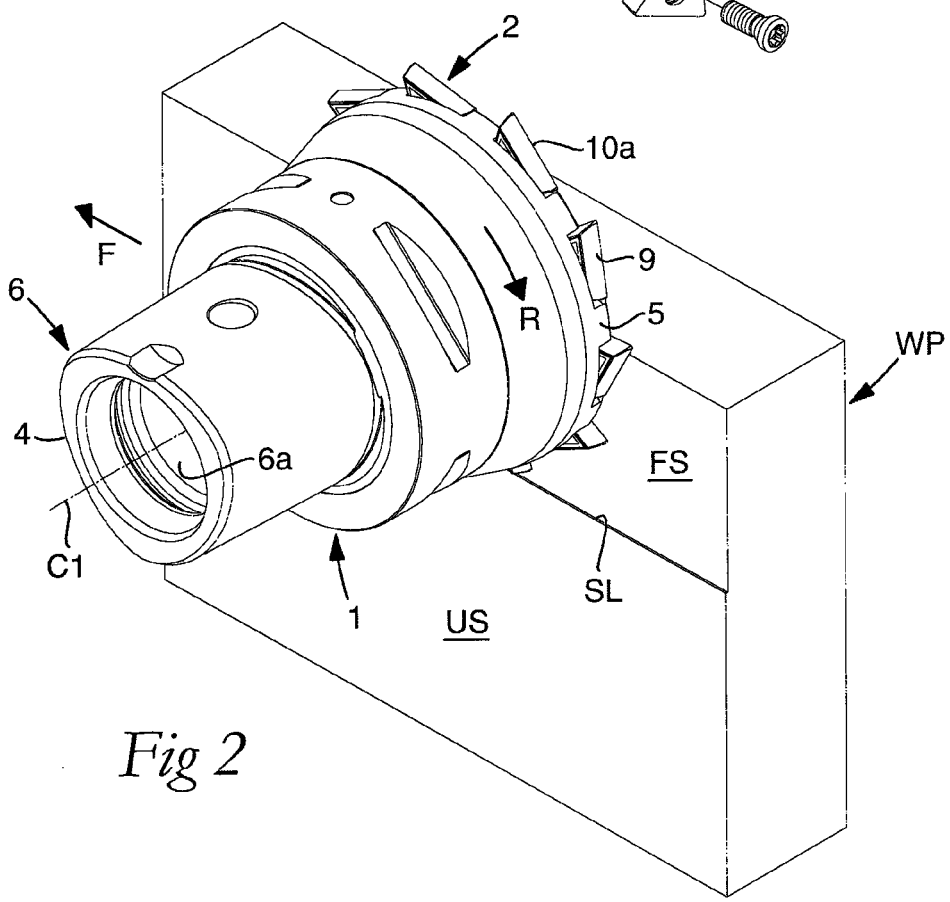
FIG. 2 is a perspective view showing the face mill during the wiping of a workpiece with the purpose of generating a plane surface on the same.

The face mill according to the embodiment shown in FIGS. 1 and 2 includes a basic or mill body 1 as well as a plurality of replaceable milling inserts 2. The basic body 1 includes front and rear ends 3, 4, between which a center axis C1 extends, around which the basic body is rotatable, more precisely in one predetermined direction of rotation R. In the example, the front end of the basic body is represented of a plane, generally circular end surface 3 that extends perpendicular to the center axis C1. In the backward direction from the front end surface 3, a rotationally symmetrical, partly cylindrical, partly conical envelope surface 5 extends, which is concentric with the center axis C1. In this case, the rear end 4 is included in a male-like coupling part 6 of the type COROMANT CAPTO®, by which the basic body can be coupled to a spindle in a machine for the transfer of torque to the same. In a hollow space 6a, a pull mechanism can be inserted by which the male-like coupling part can be pulled into a co-operating female part included in the machine.

In the usual way, the basic body 1 may be manufactured from steel or aluminium, while the individual milling insert is manufactured from a harder material, e.g., cemented carbide, ceramics, cermet, or the like.

In this example, each individual milling insert 2 is triangular and indexable. In order to allow indexing, in this case between three different positions, the same is generally of uniform thickness.

In FIG. 2, the face mill according to the embodiment is illustrated during the fine milling of a generally plane, although unmachined surface US on a schematically shown workpiece WP in the form of a parallelepiped, more precisely by the mill being longitudinally fed in the direction F at the same time as the same rotates in the direction of rotation R. In doing so, a surface layer SL is wiped off or stripped, the thickness of which in practice may be within the range of 0.1-0.5 mm, while exposing a finish-machined surface FS. In the example, the milling is carried out in up-milling, although also down-milling is possible.

Reference is now made to FIGS. 3-6, which on an enlarged scale illustrate the detailed design of the milling insert 2. The milling insert includes a front side 7 and a back side 8, between which three side surfaces 9 extend that meet each other in corners generally designated 11. The geometrical triangle that defines the basic shape of the milling insert is equilateral, whereby the angle $\alpha$ between each pair of cutting edges 10 that meet in a corner 11 amounts to 60°.

Characteristic of the milling insert 2 according to the embodiment is, on one hand, that the cutting edges 10 are straight, and on the other hand that the same may be said to have a positive, nominal cutting geometry, more precisely by the fact that the area of the front side 7 is larger than the one of the back side 8, the angle $\beta$ between the front side 7 and the individual chip surface 9 being acute, i.e., smaller than 90°. In the example shown, the angle $\beta$ amounts to 79°. This means that the nominal clearance angle $\gamma$ (see FIG. 6) between the front side 7 and an imaginary plane IP perpendicular to the chip surface 9 will amount to 11°. In practice, the angle $\beta$ may deviate from precisely 79°. However, it should on one hand not be more than 83° and on the other hand not be less than 65°.

In the example, a cutting edge 10 is delimited between the front side 7 and each one of the side surfaces 9. In other words, in this case the milling insert includes three alternately useful cutting edges 10, all three side surfaces 9 forming chip surfaces adjacent to the cutting edges.

As is seen in FIG. 5, the cutting edge 10 extends between two end points 15, 16 and has a length designated L1 between the same. In the extension of the individual cutting edge 10, which forms a primary, chip-removing cutting edge, there is formed, in the shown, preferred embodiment, a secondary cutting edge 12, more precisely adjacent to a corner 11. In the example, wherein the milling insert has a triangular basic shape, the secondary the cutting edge 12 is convex and arched by being delimited between the front side 7 and a convexly arched corner surface 13, which forms a transition between the two chip surfaces 9 that meet each other in the corner 11. In the example, the corner surface 13 tapers in the backward direction from the secondary cutting edge 12 and transforms into a part surface 13a of uniform narrowness.

L2 is measure of how far out the secondary cutting edge 12 extends (as viewed in side elevation) in the extension of the primary, straight cutting edge 10. As is seen in FIG. 5, L2 only amounts to a fraction (approx. 1/80) of L1, more precisely as a consequence of the radius of the cutting edge 12 being relatively small. Of course, the radius may be made greater, wherein L2 increases in relation to L1. It should also be mentioned that the corner surface 13 may be made with a uniform narrowness along the entire extension thereof between the front side 7 and the back side 8.

In the example shown, not only the front side 7 and the back side 8 are plane surfaces, but also each chip surface 9. In this connection, it should be pointed out that the plane back side 8 in the example includes a shallow countersink 8a surrounded by a triangular, rim-like border 8b, which has the direct contact with the basic body. Furthermore, the chip surface 9 could also be concave as viewed in cross section.

A through hole 14 runs between the front and back sides 7, 8. This hole, the center axis of which is designated C2, is centric so far that the radial distances from the center axis C2 thereof to all cutting edges 10 and corners 11, respectively, are equally great. In addition to a cylindrical part, the hole 14 includes a cone surface 14a (see FIG. 4) adjacent to the front side 7.

The size of the milling insert may vary most considerably. In practice, however, the length L1 of the primary cutting edge 10 may be within the range of 5-25 mm. In order for the milling insert to obtain the flat basic shape thereof, the thickness T thereof (see FIG. 6) has to be considerably smaller than the cutting edge length L1. In the example shown, the thickness T amounts to approx. 25% of the cutting edge length L1. In practice, T should amount to at most 40% and at least 15% of L1.

Figure 7:
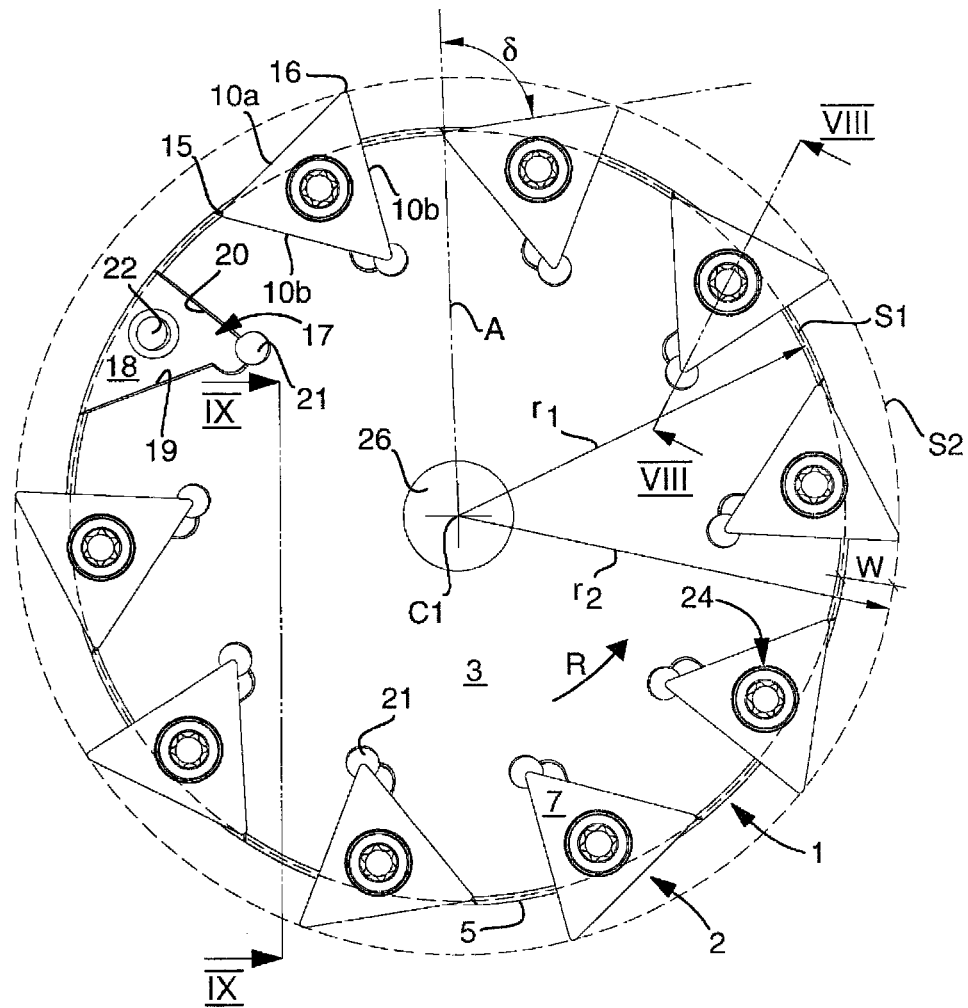
FIG. 7 is an enlarged end view showing the basic body of the mill from the front.

Reference is now made to FIGS. 7, 8 and 9, the first-mentioned one of which shows the basic body 1 in end view from the front. It should be observed that the basic body in this state is meant to assume the same position as in FIGS. 1 and 2, i.e., with the center axis C1 orientated horizontally and the end surface 3 vertically.

In the embodiment shown, the basic body 1 is equipped with ten indexable milling inserts 2 that are shown uniformly distributed along the periphery of the basic body at a pitch angle of 36°. In the mounted state of the milling insert according to FIG. 7, only one of the three cutting edges 10 is active, while the two other are inactive. In order to separate the functional states of the cutting edges from each other, the active cutting edge has been provided with the suffix "a", while the two inactive cutting edges carry the suffix "b".

Each milling insert 2 is mounted in a seat or insert seat, generally designated 17, recessed in the basic body. This seat is delimited by a bottom surface 18 as well as two side support surfaces 19, 20, which, as viewed in plane elevation according to FIG. 7, form an angle of 60° with each other to be able to receive an inner corner portion of the milling insert 2. Radially inside the two side support surfaces 19, 20, there is a clearance space 21 in which the innermost part of the milling insert can be housed without having contact with the side support surfaces 19, 20. In the shown, preferred embodiment, the seats 17 are peripherally placed along the basic body 1, the same opening not only in the end surface 3 but also in the envelope surface 5.

In the bottom surface 18 of the seat 17, a threaded hole 22 mouths in which a male thread 23 on a fixing screw 24 (see FIG. 1) can be tightened. This screw 24, which besides the male thread 23 includes a partly conical head 25 for pressing against the cone surface 14a the hole 14, is in the example of the type that by those skilled in the art is denominated "spring biased". This means that the screw, which suitably is manufactured from steel with a certain inherent elasticity, can flex. By the fact that the center hole 14 in the milling insert is located at a somewhat greater distance from the inactive chip surfaces 9 than the hole 22 from the two side support surfaces 19, 20, the screw will therefore upon tightening not only press the back side 8 of the milling insert against the bottom surface 18 of the seat, but also press the milling insert in the direction radially inward, so that the chip surfaces 9 of the two inactive cutting edges 10b are pressed against the side support surfaces 19, 20.

In practice, the different seats 17 can be manufactured at a very high dimensional accuracy, e.g., by a shank-end mill that includes cutting edges along the envelope surface thereof as well as the end surface thereof. In such a way, the seats can be milled out in such a way that all bottom surfaces 18 are accurately located on one and the same level in relation to the end surface 3 of the basic body.

The spatial location of each seat 17 is of such a nature that the active cutting edge 10a on each milling insert 2 will form a negative radial angle $\delta$ with an imaginary radial line A (see FIG. 7) that extends from the center axis C1 of the basic body and intersects one of the two end points of the cutting edge 10a, viz. a first end point 15 heading the second end point 16 during the rotation of the mill. According to the embodiment, the radial angle $\delta$ should amount to at least 70°.

As is further seen in FIG. 7, the front end point 15 of the active cutting edge 10a moves during the rotation of the mill in a circular path S1 the radius of which is designated r1, while the rotationally trailing, second end point 16 moves in a circular path S2 the radius of which is designated r2. Because the end point 16 is situated further out from the center axis C1 than the end point 15, the radius r2 becomes of course greater than the radius r1. In FIG. 7, the difference between r1 and r2 is designated W. This measure defines the width of the ring-shaped (circular) surface swept by the cutting edge 10a during the rotation of the mill (without table feed). The width measure W depends on the radial angle $\delta$ as well as on the cutting edge length L1, and may vary from one application to the other. In the example according to FIG. 7, W amounts to approx. 12% of the radius r2 of the circular path S2 and should in practice be within the range of 5-20% of r2. In other words, r1 should amount to at least 80% and at most 95% of r2. An increase of W can be effected either by increasing the cutting edge length L1 or decreasing the radial angle $\delta$, or a combination of both these measures. A decrease of W is effected in the reversed way.

In this connection, it should be pointed out that the radial angle $\delta$ of the cutting edge 10a even may be greater than 90°, however only on the assumption that r2>r1.

In FIG. 7, it should further be noted that a central, through duct 26 (see also FIG. 1) mouths in the front end surface 3 of the basic body. This duct has the purpose of conveying cooling medium or lubricant from a driving machine being behind up to the working milling inserts.

Reference is now made to FIGS. 8 and 9, which illustrate, on one hand, how the individual milling insert 2 is tipped-in at a certain clearance angle $\epsilon$ into the basic body 1, and on the other hand how the active, straight cutting edges 10a of all milling inserts 2 are situated on a common reference plane RP that is axially spaced apart in the forward direction from the front end surface 3 of the basic body. In the example, this front end surface is plane and parallel to the reference plane RP. The clearance angle $\epsilon$ shown in FIG. 8, which in practice is moderate and may amount to the size of 2 to 3°, is provided by the bottom surface 18 of the seat being located at the same angle $\epsilon$ in relation to the front end surface 3 of the basic body. In this connection, the milling insert is tipped-in around the active cutting edge 10a (also note the section VIII-VIII in FIG. 7), whereby the entire front side 7 of the milling insert that is situated rotationally behind/inside the cutting edge 10a will clear from the plane surface generated by the cutting edge. In other words, in operation the front side 7 will serve as a clearance surface of the milling insert, while the side surface 9 serves as a chip surface.

In FIG. 9, "d" designates the axial distance between the front end surface 3 of the basic body and the reference plane RP. This measure "d" has to be greater than 0.5 mm if the maximal cutting depth is calculated to 0.5 mm, however without considerably exceeding the value. The measure "d" may therefore advantageously be within the range of 0.5-1.0 mm. If the mill is designed for maximal cutting depths smaller than 0.5 mm, "d" may of course be correspondingly reduced. In this connection, it should be pointed out that the chips that are removed along the entire length of the active cutting edge 10a will be flung out radially sideward outside the mill without penetrating into the gap produced between the end surface 3 and the generated surface in the workpiece.

As previously has been pointed out, in the example, the nominal clearance angle $\gamma$ of the milling insert 2 amounts to 11° (90°−79°=11°). In its state mounted in the basic body, the milling insert is tipped-in at the angle $\epsilon$=2°. The consequence of this will be that the effective rake angle $\sigma$ of the milling insert (see FIG. 8), i.e., the angle between the chip surface 9 and an imaginary plane perpendicular to the surface to be generated will amount to approx. 9° (11°−2°=90).

Figure 10:
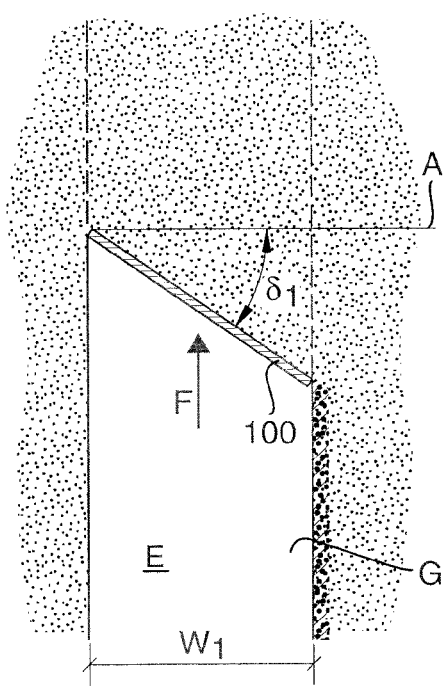
FIGS. 10-12 are a series of schematic and simplified pictures having the purpose of facilitating the understanding of function of an embodiment of the invention.
Figure 11:
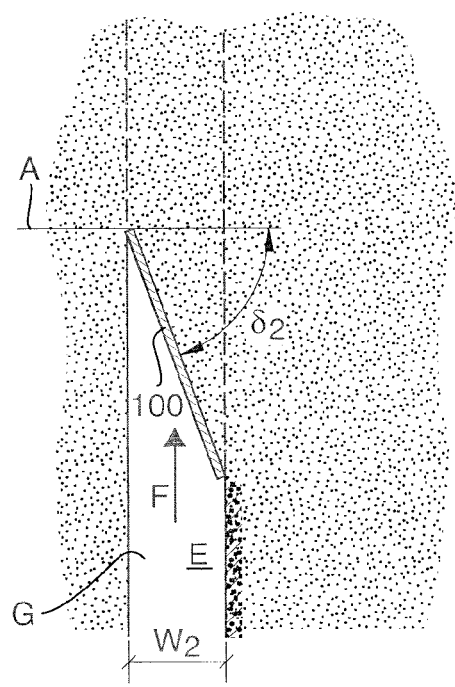
Figure 12:
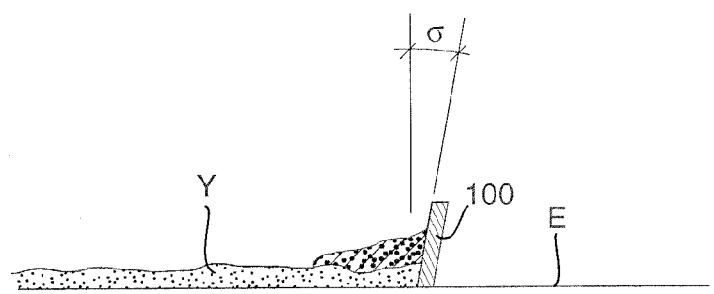
Figure 15:
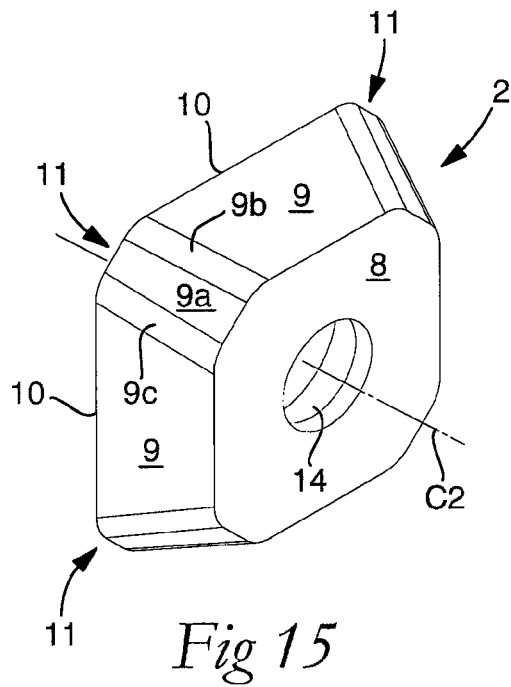
FIGS. 15-18 are a series of pictures corresponding to FIGS. 3-6 and showing the design of the quadratic milling insert.

In order to explain the function and advantages of the invention in a simple way, reference is now made to the schematic pictures in FIGS. 10-12. Here, it should be imagined that a plane substratum E (e.g., ground) is to be cleaned from a surface layer Y of a grain-shaped material (e.g., snow or gravel) by a blade 100 (e.g., a shovel) being pushed forward linearly along the substratum to expose a passage G that is straight (contrary to circular in connection with milling). In FIG. 10, the blade 100 is brought forward at a moderate angle $\delta$1 (approx. 35°) to a perpendicular A to the feeding direction F. This means that the width W1 of the exposed passage H (cf. the measure W in FIG. 7) becomes comparatively great, and that a considerable quantity of surface material has to be brought aside. The force required to push away the material will therefore be considerable, viz. as a consequence of the angle $\delta$1 being moderate. In FIG. 11, however, the same blade 100 is brought forward at an angle $\delta$2 that is approximately twice as large as the angle $\delta$1. This means that the force required to push the blade forward becomes considerably less. It is true that this gain in force occurs at the expense of a reduction of the width W2 of the passage G, but in many applications, the reduction of force is decisive whether or not the exposure should be accomplishable without problems. In FIG. 12, it is furthermore seen that the blade 100 is tilted in the direction upward/backward from the substratum as viewed in the direction of motion (cf. the effective rake angle σ of the chip surface 9 in relation to the surface to be generated). Similar to a wedge, the blade lifts up the material from the substratum and facilitates the removal thereof from the same.

Bearing in mind the metaphor illustrated in FIGS. 10-12, it should be pointed out that the function of the face mill according to the embodiment is based on a combination of three intimately connected features, namely:

a) that the negative radial angle δ of the active cutting edge is great by amounting to at least 70°, b) that the effective rake angle σ of the milling insert is positive, and c) that all active cutting edges are straight and situated in a common plane.

Isolated, the feature "a" entails the advantage that the active cutting edge easily cuts through the surface layer of the workpiece. In addition, the entering of the workpiece by the milling insert is facilitated because the active cutting edge milling cuts into the material successively, comparatively slowly and thereby smoothly, i.e., without temporarily being subjected to any abrupt and strong resistance to the rotating motion. The feature "b" vouches for an aim to be thrown out from the machined surface being applied to the practically short metal chips broken-away by the cutting edge. In this respect, the cutting edge may be compared to a wedge or a doctor blade that splits or strips the surface layer and tosses away the chips from the completed surface to be generated. Also the fact that the cutting edges, due to the great negative radial angle thereof, fling out the chips radially from the basic body, rather than forward in the direction of rotation (in particular when the speed of rotation and thereby the centrifugal force is great), contributes significantly to a good chip evacuation. The feature "c" ensures in turn that the generated surface obtains an optimum flatness and surface finish, without any concave chutes or other disturbing, visible irregularities, such as scratches, grooves or bulges. Practical tests with the face mill according to the invention have accordingly shown that a surface finish Ra of 1 μm or better can be attained.

Reference is now made to FIG. 13, in which it is illustrated how the face mill according to the embodiment also may be used for fine milling of other surfaces than precisely plane, e.g., cylindrical or conical. In the example, a cylindrical workpiece WP is clamped in a chuck, by which the same may be brought to rotate by a comparatively moderate speed, more precisely around a center axis C3. The face mill according to the embodiment is arranged with the center axis C1 thereof perpendicular to C3. By longitudinally feeding the mill in either of the two directions, which is outlined by the double arrow in FIG. 13, along a generatrix along the cylinder surface of the workpiece, at the same time as the mill is rotated at a relatively high rotational speed, a thin surface layer can be stripped from the cylinder surface while producing a machined, cylindrical surface having a high surface finish.

In this context, it should be emphasized that the chip removal of the individual milling insert primarily is carried out along the straight, primary cutting edge 10. However, in the chip removal, to a certain extent also the secondary cutting edge 12 participates that is situated closest to the rotationally rear end point 16 of the primary cutting edge. Because the milling insert is tipped-in at the angle c in relation to the reference plane RP, more precisely around the cutting edge line of the primary cutting edge 10, also the secondary cutting edge 12 will assume a tilted position in relation to the reference plane RP and thereby in relation to the generated, plane surface in the workpiece. The result of this will be that the secondary cutting edge 12, during the rotation and feed of the mill, cuts out a concave surface of revolution in the remaining, unmachined surface layer. This means that also the secondary cutting edge contributes to making the milling insert easy-cutting.

Reference is now made to FIGS. 14-18, which illustrate an alternative tool design that makes use of quadratic milling inserts 2 instead of triangular. In this case, the individual seat 17 of the basic body 1 is U-shaped instead of V-shaped. More precisely, the seat includes, in addition to a bottom surface 18, two side support surfaces 19, 20 orientated at an angle of 90° to each other. The third side surface 20a, which is opposite the side support surface 20, is spaced apart from the last-mentioned one by a distance that is greater than the distance between two diametrically opposed chip surfaces 9. This means that only the chip surfaces adjacent to two inactive cutting edges get support, viz. against the side support surfaces 19, 20, while the chip surface adjacent to the third, inactive cutting edge lacks contact with the seat. In other respects, the active cutting edge 10a is turned-out in relation to the periphery of the basic body in the previously described way, i.e., so that the rotationally trailing end point 16 of the cutting edge is situated at a greater radial distance from the center axis C1 than the heading one 15.

Figure 16:
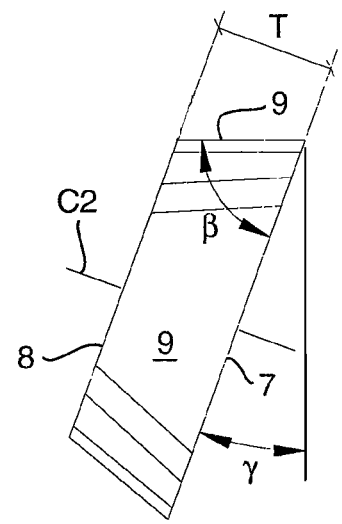

In FIG. 16, it is seen that the angle β between the chip surface 9 and the front side 7 is smaller than in the preceding example. More precisely, in this case β amounts to 70°, which means that the nominal clearance angle γ will be 20°. In its mounted state, therefore, the milling insert gets an effective rake angle of approx. 18°, if the effective clearance angle of the milling insert still amounts to 2° (20°−2°=18°). An advantage of the quadratic milling insert according to FIGS. 15-18 in comparison with the previously described, triangular milling insert, is of course that an additional, fourth cutting edge can be utilized before the milling insert has to be discarded.

Figure 17:
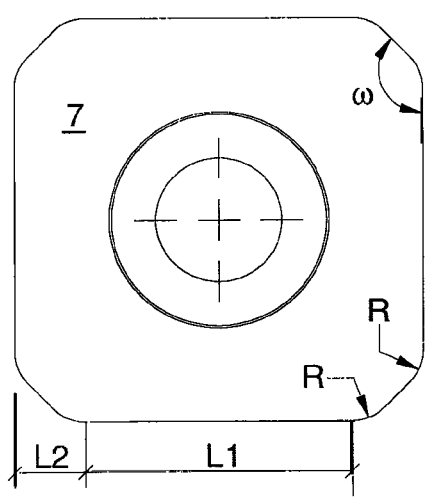
Figure 18:
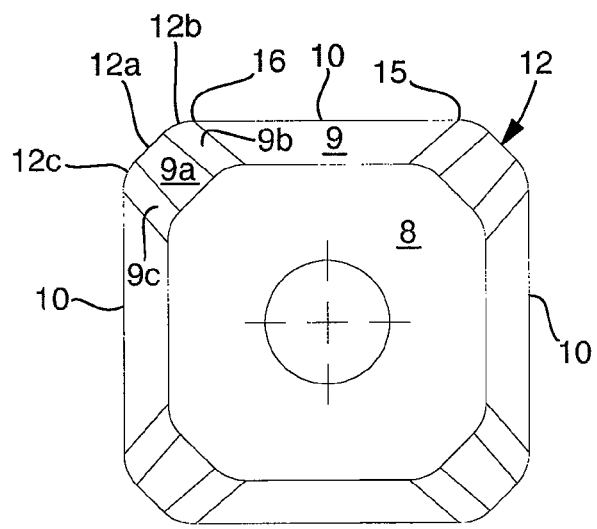

In the shown, quadratic milling insert 2, the secondary edge section 12 between each pair of meeting, primary cutting edges comprises a straight edge section 12a as well as two arched edge sections 12b, 12c between the straight edge section and the two primary cutting edges 10. The straight edge section 12a connects to a plane chip part surface 9a and forms an obtuse angle ω (see FIG. 17) with the primary cutting edge 10. In the example, ω amounts to 135°. The arched edge sections 12b, 12c are connected to convexly arched chip part surfaces 9b, 9c. As is shown in FIG. 17, the two edge sections 12b, 12c may have one and the same radius R. It should further be noted that the measure L2 in this case is comparatively great in relation to the measure L1.

During the chip removal, in addition to the primary, straight cutting edge 10, at least the adjacent edge section 12b participates. If the cutting depth would be very small, only the edge section 12b participates, but at greater cutting depths, also the straight edge section 12a participates. If the cutting depth would be close to maximal, i.e., up to 0.5 mm, also the third edge section 12c can be activated.

Figure 19:
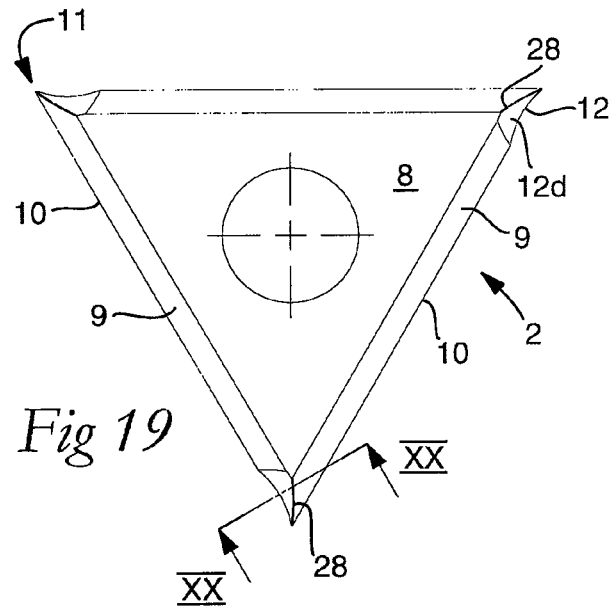
FIG. 19 is a rear plan view of an alternative embodiment of a triangular milling insert.
Figure 20:
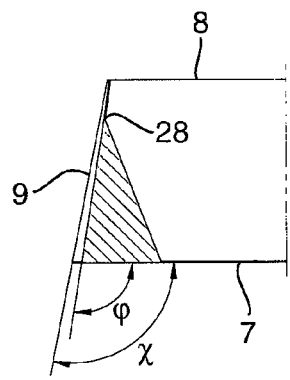
FIG. 20 is an enlarged detailed section XX-XX in FIG. 19.
Figure 21:
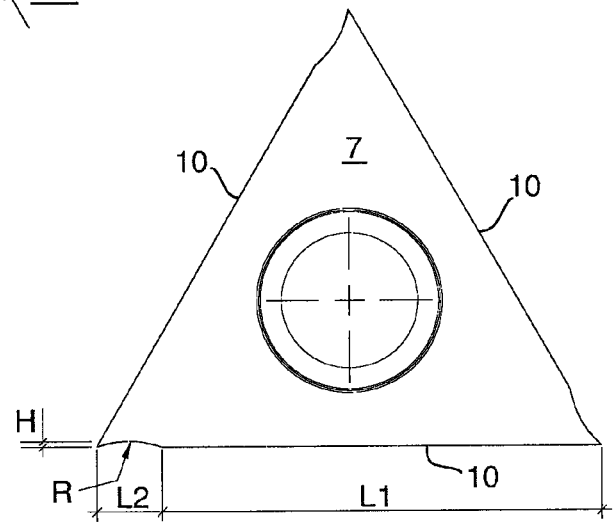
FIG. 21 is a front plan view of the milling insert according to FIG. 19.

In FIGS. 19-21, a triangular milling insert 2 is shown, the secondary edge section 12 of which in the extension of a primary, straight edge section 10 has a concave shape by being delimited between the front side 7 and a concavely arched part surface 9d. Due to the concave shape of the part surface 12d, an utmost sharp, second cutting edge 28 (corner edge) can be formed between the same and an adjacent (inactive) chip surface 9, and which in an effective way can cut into the surface layer to be removed. The length L2 and radius R of the secondary edge section 12 may vary. In the example, the length L1 of the primary edge section 10 amounts to 14.3 mm and L2 to 2.1 mm, the radius R amounting to 3 mm. The rise H of the arc formation will then be 0.2 mm. In the example, the obtuse angle χ (=90°+γ in FIG. 16) between the chip surface 9 and the front surface 7 amounts to 101°, the angle φ between the deepest situated part of the part surface 12d and the front side 7 amounting to 99°.

Concerning the milling insert according to the embodiment, the same should be regarded in intimate association with the type of face mill in question, i.e., a mill that has the purpose of stripping only a thin surface layer, the milling inserts thereof being flat and including comparatively thin chip surfaces, which remove chips in a plane that is perpendicular to the rotation axis of the mill. Simply expressed, the cutting edges can therefore be said to operate lying instead of standing, as is the case with conventional face mills. In other words, the milling insert should not be compared with conventional, flat face milling inserts, the thin side surfaces of which form clearance surfaces while their front sides form chip surfaces.

Figure 22:
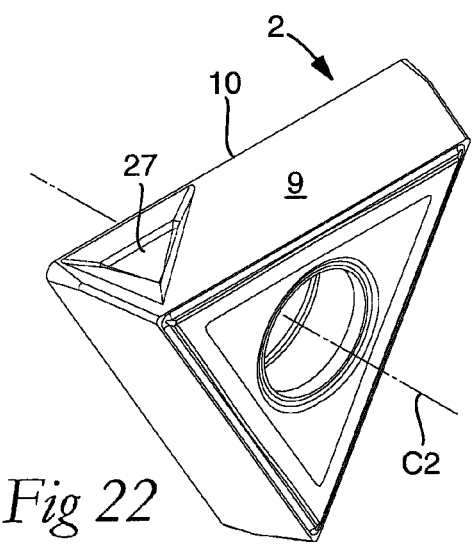
FIG. 22 is a perspective view of an additional alternative embodiment of a milling insert for a face mill.

In FIG. 22, a modified embodiment is shown of the described, triangular milling insert 2. In this case, a pit or countersink 27 serving as a chip breaker is formed in the chip surface 9. The shape and the size of this chip breaker may vary most considerably depending on the specific application of the mill, which among other things depends on the material that is to be machined. Although only one chip breaker 27 is schematically shown in FIG. 14, all chip surfaces 9 should of course be formed in the same way. Also the previously described concave part surface 12d delimits a countersink that to a certain extent serves as a chip breaker.

As has previously been mentioned, the radial angle δ should amount to at least 70°, wherein the same even may exceed 90°. In practice, however, radial angles within the range of 75-85°, suitably 77-81° are preferred. The effective clearance angles ε of the milling insert 2 should not be less than 2°, but neither be more than 4°. In order to provide a sufficiently great effective rake angle σ for the milling insert, the same should, therefore, have a nominal clearance angle γ that amounts to at least 7°. On the other hand, γ should not be more than 25°. Advantageously, γ may be within the range of 10-20°.

The invention is not limited only to the embodiments described above and shown in the drawings. Thus, it is possible to design the face mill with more as well as fewer milling inserts than precisely ten, e.g., only one. If the mill is equipped with a plurality of milling inserts, these do not necessarily need to be uniformly distributed. Neither do they necessarily need to be equidistantly spaced apart from the center axis of the basic body. Furthermore, the milling inserts do not need to be peripherally placed along the mill body. Thus, the individual milling insert may be mounted in a seat that is countersunk in the end surface of the mill body without forming an opening in the envelope surface. Instead of screws, other devices may be used for fixing the milling insert, e.g., a tightening mechanism built-in in the mill body. In the mill body, adjustment devices may, if required, also be built in for individually adjusting the spatial locations of the different milling inserts. If chip breakers in the form of countersinks are formed in the chip surfaces of the milling insert, these may be given a most varying design that deviates from the one exemplified in FIG. 22. For instance, it is possible to extend the individual countersink, even so much that it extends essentially along the entire length of the chip surface. In this connection, the edge-forming material portion that delimits the countersink may be given a rake angle that is considerably smaller than the rake angle β exemplified in the drawings. It should also be mentioned that the two front and back sides of the milling insert advantageously may be ground to ensure a meticulous positional accuracy in the mounted state of the milling insert. Furthermore, the individual chip surface does not necessarily need to be plane. It may also be concavely arched in cross section. In this connection, it should also be pointed out that the concept "straight cutting edge" also should be considered to include such cutting edges that get microscopic shape deviations from absolute straightness in the manufacture. In order to avoid that the cutting edge gets a concave contour shape (which by those skilled in the art is regarded as devastating for the smoothness of the machined surface), it is accordingly usual to design the requisite compression moulding presses in such a way that the chip surfaces and the cutting edges connecting to the same obtain a certain camber, the rise of which may amount to one or a few micrometers. When the outcome of the manufacture is good, the cambers remain, but if the outcome becomes poorer, e.g., by shrinkage along the periphery, the same ensure that the finish-sintered cutting edge in any case does not become concave. Although the front end surface of the basic body in the examples is plane and extends in a plane perpendicular to the center axis, the same does not necessarily need to be plane. Thus, the end surface could be arched, in particular concavely arched, the peripheral, circular limiting line thereof being located in the plane. In the drawings, the milling inserts have been illustrated with sharp cutting edges along which a plane front side meets plane chip surfaces along plain, straight cutting edge lines. In the usual way, the cutting edge lines may be reinforced in various ways, e.g., by forming reinforcement bevels between the same or by brushing while rounding the same slightly. Moreover, the basic body of the mill may be coupled to the driving machine by other couplings than precisely of the type COROMANT CAPTO®. In conclusion, it should be mentioned that the milling inserts included in the mill, on one hand, may be single-edged, i.e., non-indexable, and on the other hand manufactured from numerous other hard materials than precisely traditional cemented carbide, e.g., ceramics, cermet, CBN (Cubic Boron Nitride), PCD, etc. Of course, the primary cutting edge of the milling insert does not necessarily need to be combined with a secondary cutting edge, but may extend all the way from corner to corner.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A face mill for fine milling, comprising:
    a basic body that is rotatable around a center axis (C1) in a predetermined direction and has a front end surface as well as an envelope surface concentric with the center axis (C1); and
    a replaceable milling insert that is mounted in a seat and has the shape of a polygon that includes a front side, a back side and a plurality of side surfaces, which converge in pairs into corners and at least one of which forms a chip surface that, together with the front side, delimits a cutting edge, which is tangent to an imaginary reference plane (RP) that extends perpendicular to the center axis (C1) and is axially spaced apart in the forward direction from the front end surface of the basic body, the front side of the milling insert being tilted at a clearance angle (ε) in relation to the reference plane (RP), the cutting edge of the milling insert extending between two end points, a first one of which, during the rotation of the mill, is heading the second one as well as moves in a circular path, the radius of which is smaller than the radius of a circular path in which the second, rotationally trailing end point moves, the cutting edge forming a negative radial angle (δ) with an imaginary radial line (A) that extends from the center axis (C1) of the basic body and intersects the first end point of the cutting edge, wherein the front side and chip surface of the milling insert mutually form a nominal angle (β) that amounts to at most 83°, and wherein the cutting edge is straight and in the entire length thereof situated in the reference plane (RP), the negative radial angle (δ) thereof amounting to at least 70°.

2. The face mill according to claim 1, wherein the straight cutting edge of the milling insert forms a primary cutting edge in the extension of which a secondary cutting edge is formed adjacent to a corner of the milling insert.

3. The face mill according to claim 2, wherein the secondary cutting edge of the milling insert is convex and arched by being delimited between the front side and a convexly arched corner surface that forms a transition between two side surfaces.

4. The face mill according to claim 2, wherein the secondary cutting edge of the milling insert comprises a straight edge section, which runs at an obtuse angle (ω) from the primary cutting edge, as well as an arched edge section, which forms a transition between the primary cutting edge and the straight edge section.

5. The face mill according to claim 2, wherein the secondary edge section of the milling insert is concave by being delimited between the front side and a concavely arched part surface, to which also a second cutting edge connects that runs backward from the front side.

6. The face mill according to claim 1, wherein the milling insert is indexable and therefore of uniform thickness as well as comprises a plurality of cutting edges, one of which is active and the other ones inactive during operation.

7. The face mill according to claim 6, wherein the front side as well as the back side of the milling insert are plane and mutually parallel surfaces.

8. The face mill according to claim 1, wherein the seat of the milling insert opens in the front end surface of the basic body and includes a bottom surface, which is tilted in relation to the reference plane (RP) at an angle corresponding to the desired clearance angle (ε) of the milling insert.

9. The face mill according to claim 8, wherein the seat, in addition to the bottom surface, includes two straight side support surfaces, against which the chip surfaces adjacent to a pair of inactive cutting edges are pressed.

10. The face mill according to claim 9, wherein the milling insert is fixed in the seat by a screw, which is in engagement with a threaded hole mouthing in the bottom surface of the seat, and which is spring biased to press the back side of the milling insert against the bottom surface of the seat, and to press the chip surfaces adjacent to the inactive cutting edges against the side support surfaces.

11. The face mill according to any claim 8, wherein the seat is peripherally placed and opens in the envelope surface of the basic body.

12. The face mill according to claim 1, wherein the milling insert has an equilateral triangular basic shape and includes three cutting edges.

13. The face mill according to claim 1, wherein the milling insert has a quadratic basic shape and includes four cutting edges.

14. The face mill according to claim 1, wherein the radial distance between the center axis (C1) of the basic body and the first end point of the active cutting edge amounts to at least 80% of the radial distance between the center axis (C1) and the second, rotationally trailing end point of the cutting edge.

15. The face mill according to claim 1, wherein the milling insert has a thickness between the front side and the back side that amounts to at most 50% of the length of the cutting edge.

16. The face mill according to claim 1, wherein a countersink serving as a chip breaker is formed in the chip surface of the milling insert.

17. The face mill according to claim 1, comprising a plurality of mutually spaced-apart milling inserts, the active cutting edges of which are mutually situated in the reference plane (RP).

* * * * *